(12) United States Patent
Begen (10) Patent No.: US 8,059,821 B1
(45) Date of Patent: Nov. 15, 2011

(54) METHOD AND SYSTEM FOR DISASTER RECOVERY IN NETWORK SYSTEMS

(75) Inventor: Geoffrey Charles Begen, Lake Forrest, CA (US)

(73) Assignee: Stamps.com Inc., Los Angeles, CA (US)

( * ) Notice: Subject to any disclaimer, the term of this patent is extended or adjusted under 35 U.S.C. 154(b) by 980 days.

(21) Appl. No.: 11/616,537

(22) Filed: Dec. 27, 2006

(51) Int. Cl.
*H04L 9/08* (2006.01)
*H04L 29/06* (2006.01)
*G06F 11/16* (2006.01)

(52) U.S. Cl. ............ 380/286; 726/6; 714/4.11; 713/156

(58) Field of Classification Search .................. 713/156; 714/6, 4.11; 380/286; 726/6
See application file for complete search history.

(56) References Cited

U.S. PATENT DOCUMENTS

| | | | |
|---|---|---|---|
| 5,611,048 A * | 3/1997 | Jacobs et al. ...................... | 726/5 |
| 5,717,597 A * | 2/1998 | Kara .............................. | 705/408 |
| 6,804,703 B1 * | 10/2004 | Allen et al. .................... | 709/216 |
| 6,898,577 B1 * | 5/2005 | Johnson ......................... | 705/51 |
| 2003/0065739 A1 * | 4/2003 | Shnier ........................... | 709/217 |
| 2003/0152235 A1 * | 8/2003 | Cohen et al. ................... | 380/278 |
| 2004/0218763 A1 * | 11/2004 | Rose et al. ..................... | 380/277 |
| 2005/0025315 A1 * | 2/2005 | Kreitzer ......................... | 380/270 |
| 2005/0086298 A1 * | 4/2005 | Campbell et al. ............. | 709/203 |
| 2005/0102509 A1 * | 5/2005 | Fascenda ....................... | 713/165 |
| 2006/0143705 A1 * | 6/2006 | Sentoff .......................... | 726/19 |
| 2006/0291664 A1 * | 12/2006 | Suarez et al. .................. | 380/286 |
| 2007/0016663 A1 * | 1/2007 | Weis ............................. | 709/223 |
| 2007/0101129 A1 * | 5/2007 | Wong et al. ................... | 713/160 |
| 2007/0101134 A1 * | 5/2007 | Parlan et al. .................. | 713/168 |
| 2007/0198416 A1 * | 8/2007 | Ye ................................. | 705/51 |

* cited by examiner

*Primary Examiner* — Kambiz Zand
*Assistant Examiner* — Michael Guirguis
(74) *Attorney, Agent, or Firm* — Fulbright & Jaworski L.L.P.

(57) ABSTRACT

A method and apparatus for managing and backing-up a set of security keys are disclosed. The keys are generated first at a backup site and then are transmitted from the backup site to the primary site. The primary site then uses these keys to generate message authentication code for messages generated at the primary site. A portion of the key information is transmitted to a client site in the message. The client site then provides the message authentication code back to the service in a subsequent request. The message authentication code generated at the primary site is readable by the backup site. The primary site then takes the portion of the key information and uses this to verify the received message authentication code. In alternative embodiments the actual values used for generating the message authentication code are not transmitted in the message nor are the exposed to the public side of the service.

27 Claims, 4 Drawing Sheets

| KEY ID (211) | KEY DATA (212) | DATE CREATED (213) |
|---|---|---|
| 5 | 13154151 | 01-07-2006 06:00 |
| 6 | 4571386745374 | 01-07-2006 14:00 |
| 7 | 4325235325 | 01-07-2006 18:00 |
| 8 | 34874324841 | 01-07-2006 23:00 |

210

220

| KEY ID (221) | KEY DATA (222) | DATE CREATED (223) |
|---|---|---|
| 1 | 245851754 | 01-01-2006 06:00 |
| 2 | 15642345641 | 01-01-2006 14:00 |
| 3 | 2465474 | 01-01-2006 18:00 |
| 4 | 4561871 | 01-01-2006 23:00 |

METHOD AND SYSTEM FOR DISASTER RECOVERY IN NETWORK SYSTEMS

CROSS-REFERENCE TO RELATED APPLICATIONS

The present application is related to co-pending, commonly assigned, U.S. patent application Ser. No. 10/082,398 entitled "SYSTEM AND METHOD FOR PRINTING MULTIPLE POSTAGE INDICIA," filed Feb. 25, 2002 and U.S. patent application Ser. No. 10/862,058 entitled "VIRTUAL SECURITY DEVICE" filed Jun. 4, 2004 the disclosures of which are hereby incorporated herein by reference.

TECHNICAL FIELD

The present disclosure is directed to disaster recovery in network systems. More specifically, the present disclosure is directed to disaster recovery on a backup location when a primary location has failed.

BACKGROUND

Web services are typically implemented by a farm of web servers. A farm of web servers includes a number of web servers located at a single site. The servers in the farm communicate with one another to perform a set of operations for the service. Client computers make requests to the farm, and one of the servers in that farm picks up and responds to the request. In many services, especially secure services, the response or a portion of that response is provided as a portion of the next request to the service, such as to identify the client in subsequent requests, to indicate a state of the transaction, etc.

For example, a secure service needs to trust that the client computer that makes subsequent requests is the same client that was validated in a previous request. One way to accomplish this without validating the client with each request is to use information returned from the server in response to a previous request which is returned in a subsequent request, where information, such as the state of the transaction, is passed between the client and the server. Authentication of such information may be desired in subsequent requests, in addition to or in the alternative to authentication of the client. One approach to this is to package the data in a message, and place a Message Authentication Code (MAC) along with the data. Typically, the MAC is implemented using certain authentication algorithms. One example algorithm is Hash Message Authentication Code (HMAC). This approach uses a secret key log and the HMAC algorithm to generate a hash of data that is to create a MAC that is sent back to the client computer in the message. The client is required to provide this MAC back to the service when the client makes its next request. Through the use of the MAC feedback there is a strong presumption that the client has not modified, tampered or tried to create false data for the secondary request.

The problem with using keys in a web service is that a service often maintains multiple sites to provide the service. For example, the service could have a primary site in Los Angeles with a farm of servers providing the web service, but there could be another site in another city, such as Minneapolis, that can provide the same service. This other site is provided in the event there is a disaster in the city where the main service is located that causes the primary site to go down, or to handle overflow in the system. If the service desires to have an absolute 100% up time for its service, even in a worst case scenario where the primary site goes down, there is a possibility that the response to the first request from a client in this flow was handled by the primary site, and following the disaster the secondary request will be routed to the disaster recovery site or backup site. However, in this approach there is a problem maintaining synchronization of the keys between the two sites, because the keys are maintained on the primary site and not on the secondary site.

Moreover, when the service uses a farm of servers to provide the service, each server in that farm needs to have the keys as well. This creates an additional problem of synchronization between the servers at one site in addition to the synchronization problem when using multiple sites. The above synchronization is not a problem if the service does not rollover keys. By rolling over keys, the keys are replaced on a periodic basis to enhance security. When using keys for generating message authentication codes it is desirable that the key only works for a short period of time. In a typical web server the keys might be updated once a week to provide each server in the service with a list of keys, and each MAC created with this key may only be valid for a day after it is used. If the keys were permanently valid there would be no need to update them. However, because it is desirable to ensure that there is no opportunity to "hack" the system, keys are only valid for a certain period of time. Typically, the keys are valid for a time period that is significantly shorter than the time it would take someone to brute force hack the key. Using this approach by the time a hacker computes what the key was, the key has already rolled over and it is no longer valid. An additional problem of rollover is that when the keys are changed any messages that are out at client machines are invalidated immediately.

BRIEF SUMMARY

The present disclosure is directed to systems and methods which move key generation for message authentication from the primary site to the backup site. Additional embodiments are directed to systems and methods which move message authentication, message authentication code creation, and authentication from individual publicly accessible servers in a farm, or other computers, into a data repository that is shared by all the public servers at that farm. The data repository includes the actual data storage and a processor. The data storage and processor are located on at least one data server in the data repository. This processor can be redundant within the farm, so it can be switched between data servers in the repository in any failure recovery within the farm. Data storage is shared between the data servers that are part of the repository and part of the farm.

Code is placed into the data servers, that allows for the generation of a message authentication code (MAC) by processing a key through a standard message authentication code generation algorithms. Code is also placed into the data server that allows for the generation of new keys at any time. This process is implemented by the data server, and the public servers make the call to the data server for this information. In some embodiments, the public servers do not have access to the key itself. Thus, the key is never available on the publicly accessible server. In this embodiment, the publicly accessible servers receive from the data server the MAC, a key identifier, and the expiration time.

There are a few operations that are exposed from data server of the data repository to the servers on the public side. These operations can include creating a MAC for a message, authenticating messages and rolling over the keys or other indicators. When a rollover operation is performed in some embodiments a new key or set of keys is generated. These new keys are stored in an active key table, and keys existing in the active key table for which there can be no valid messages can be moved to an inactive key table.

The active key table is replicated from a backup site to a primary site. The backup site generates the keys so that it will always have an up to date set of keys Once the new keys have been generated the backup site remains inactive until activated by a failure at the primary site. When the backup site receives a message it attempts to validate the message. The public servers on the backup site request authentication of the message. The backup site first compares the authentication information with the data in the active key table. If the key identifier in the message matches a key in the active key table then authentication can go forward. If, however, the key is not in the active key table the authentication process looks to the inactive key table. If the information is in the inactive key table then authentication can still occur. This dual check of the active and inactive key tables helps the backup site service incoming messages that are still valid, but not using the active keys. This can occur if the transfer of the keys from the backup site to the primary site failed or if the updating of keys occurred after valid messages were sent out. In some embodiments the remaining data needed to authenticate a message is transmitted between the primary and disaster sites by the client. So if there is important data that needs to go from a first request to the next request, it is routed through the client. Only the key needs to be replicated to the primary site from the backup site so that the subsequent requests can be serviced by the backup site. In the preferred embodiments the rollover key procedure runs first at the backup site, and then the data is replicated from the recovery site to the primary site. This insures that any data that is on the primary site is already on a back up backup site before it is used by the primary site.

The backup site is a failure site, and is not used in normal operation. Normal operations occur through the primary site, where it services all request from any client anywhere. The backup site remains mostly idle waiting to be activated at a moment's notice if primary site goes down. At that time the recovery site becomes the primary site. In these embodiments the recovery site generates the new keys, and replicates these keys back to the primary site. This guarantees that by the time a MAC is generated at the primary site using a new key, that new key is already on the backup site for use in the event of a failure.

The foregoing has outlined rather broadly the features and technical advantages of the present embodiments in order that the detailed description that follows may be better understood. Additional features and advantages of the embodiments will be described hereinafter which form the subject of the claims. It should be appreciated by those skilled in the art that the conception and specific embodiment disclosed may be readily utilized as a basis for modifying or designing other structures for carrying out the same purposes of the present embodiments. It should also be realized by those skilled in the art that such equivalent constructions do not depart from the spirit and scope of the invention as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
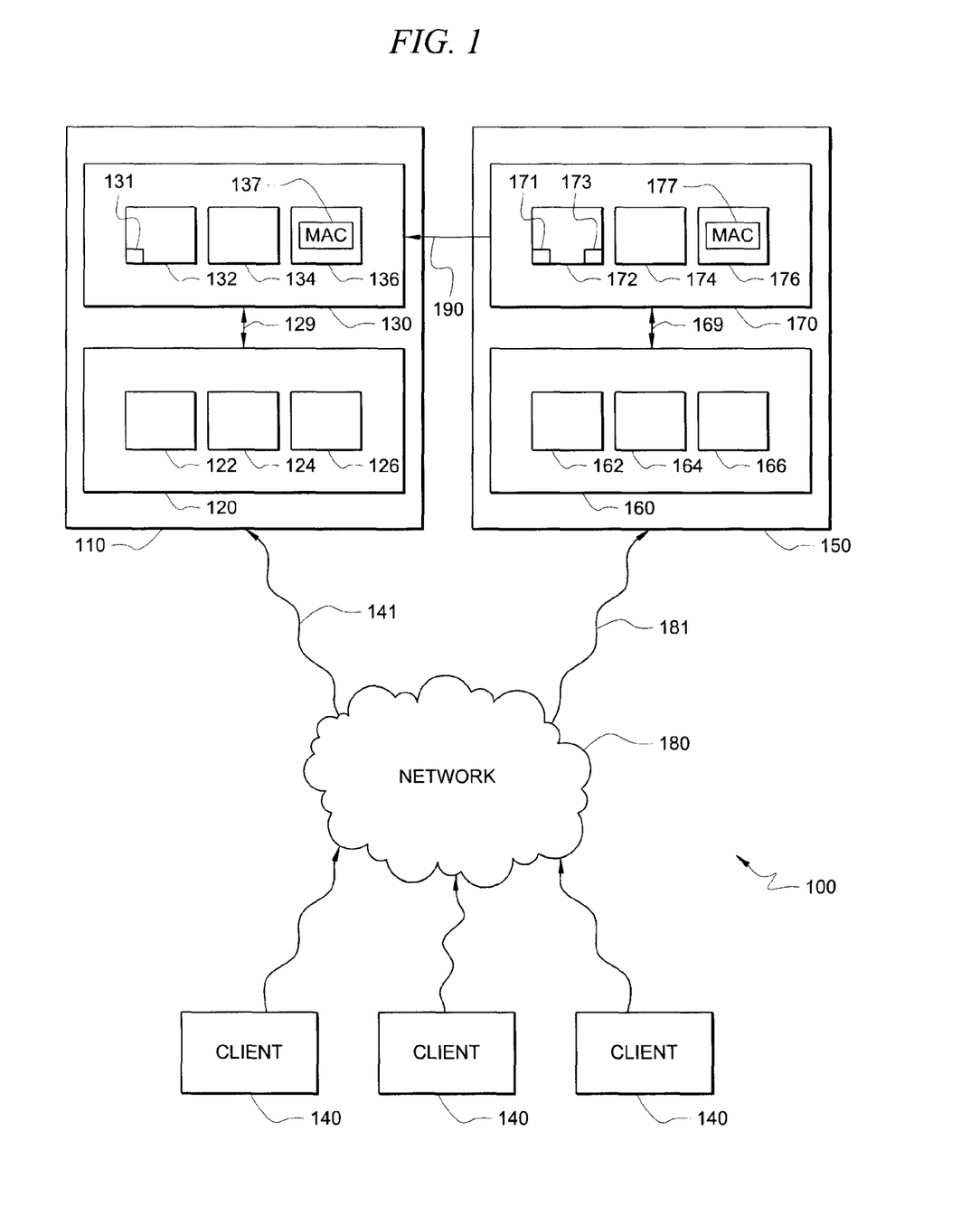
FIG. 1 is a block diagram illustrating components of a service according to one embodiment.

FIG. 1 is a block diagram illustrating a service environment according to one illustrative embodiment. In one embodiment, the service is a web service, in particular one illustrative embodiment is directed to generating indicia of postage. However, other types of services can be used. Service environment 100 includes a primary site 110 and a secondary or backup site 150. Both the primary site 110 and the backup site 150 have a server farm, shown as farm 120 and 160, respectively, providing a service. Each of the farms 120, 160 has a number of servers, shown as servers 122, 124, 126 and 162, 164, 166 respectively, that can provide the service. While only three servers are illustrated in the farms 120, 160, those skilled in the art will recognize that farms 120, 160 can have more or less servers (including a single server). Sites 110 and 150 also have an associated data repository 130, 170. The data repositories 130, 170 have a number of data servers or data stores, shown as data stores 132, 134, 136 and 172, 174, 176, respectively. Additionally, data servers 136 and 176 have, in one embodiment, a message authentication code generator 137, 177 for generating message authentication code. While the message authentication code generator 137, 177 has been illustrated on sever 136 and 176, those skilled in the art will recognize that the message authentication code generators 137, 177 can be located on other servers as well.

Primary site 110 represents the physical location of the service that is connected to a network 180. Network 180 can in various embodiments include a wide area network (WAN), local area network (LAN), extranet, intranet, the internet or any other networked environment. In operation, a client 140 makes a request to the service 120 to perform a service or portion thereof. In one embodiment, client 140 is requesting the generation of postage. The client 140 communicates this request over the network 180 to the primary site 110. The request is routed to one of the servers 122, 124, 126. The selected server provides a response to the client 140. In the embodiment, where the request is to generate postage, this response can be the current balance in an account associated with the client 140. In order to use the service, the client 140 must be validated. Once validated the user or client 140 can access a value bearing account. In subsequent requests the client may debit the account. Therefore, it is necessary to ensure the client 140 is a trusted client, and is accessing the proper account. This information as to the client 140 and the accounts they may access may be included in the request or any response. The server communicates with data repository 130 to generate a message authentication code (MAC) for the data. This MAC is then transmitted back to the client 140.

As mentioned above the data repository 130 includes data servers 132, 134, 136. These servers 132, 134, 136, in one embodiment, have coding to implement MAC, and use stored keys in a database 131 to calculate the MAC. The identifier of the key used to generate the message authentication code along with the MAC is provided back to the server 122, 124, 126. This to and from communication is illustrated by arrow 129. The server 122, 124, 126 packages the MAC into the response that is sent back to the client 140 over network connection 141.

The client 140 then makes a subsequent request providing data received from the first request (e.g. the MAC) in this subsequent request. In some embodiments additional data is provided along with this subsequent request. For example, after receiving a message indicating the account balance the user may send a request back to the service indicating the value of the postage desired. In another example, the first request was a request to generate a desired postage, and the response back was a link to where the generated indicia can be retrieved. In this subsequent request the client will provide back to the service key ID, expiration time, and the MAC that were received in the first message. This request will be routed to the primary site 110 through the network 180. A server 122, 124, 126 in the farm 120 will pick up the request. The selected server then authenticates this message. The server queries data repository 130 through one of the data servers 132, 134, 136 to authenticate the information given in the request. In one embodiment, the key ID, the expiration time, and the actual message authentication code are provided to one of the data servers 132, 134, 136. However, other information can be provided. In alternative embodiments the process of verification can be distributed between the servers 132, 134, 136. This distribution can be done for a variety of reasons such as load balancing.

The data server then compares this information with stored information such as information stored in table 131. In one embodiment the comparison includes identifying in the MAC the key ID used to generate the MAC. From this key ID the server 132 accesses the key in the active table and generates a MAC based on the key. This generated MAC is compared to the received MAC. Based on this comparison a decision is made whether or not the message should be trusted. The server 122, 124, 126 then acts based on this comparison. This comparison can occur either on the data server 132 or the server 122. If the message is not trusted the service will send an error message back to the client 140, and not process the message. If the message is trusted the service performs the operation that has been requested. In the example of postage, the service can provide the location of the indicia of the postage back to the client 140.

In a disaster recovery scenario, if between the two requests discussed above, something happens to the primary site 110 that causes the connection to become invalid, the routers on the network 180 can be configured to route all traffic that was destined for the primary site 110 to the backup site 150. This failure can be caused by a computer failure or an actual physical disaster (earthquake, hurricane, terrorist attack, etc.) at the location of the primary site 110. Thus, each of the clients 140 are routed from path 141 through the network 180 to the backup site 150 along network connection 181. Backup site 150, in one embodiment, is an exact copy of the primary site 110. In other embodiments the backup site 150 is at least a functional equivalent of the primary site 110. The request for the desired process is routed to one of the servers 162, 164, 166, which then request the data repository 170 through one of the data servers 172, 174, 176 to validate the authentication code in the message.

When a primary site failure occurs between two calls from a single client 140, the initial call generated a message authentication code for the message to be used in a subsequent call, at the primary site 110. However, due to the failure, the request for processing the subsequent message was routed to the backup site 150. In one embodiment, the backup site 150 does not have all of the information that was generated at the primary site 110. However, it is capable of authenticating the message, as everything required to authenticate the message is either duplicated between the sites or provided in the message. The backup site 150 processes the message using the MAC and key ID provided in the message. For example, the backup site 150 receives a message to be authenticated following the failure of the primary site 110. The message that is received includes the MAC along with other information used to generate the MAC such as client name, account number or the amount of the requested postage. However, any information can be provided in the message. The backup site 150 can use this information in the message to validate the message. The only "piece" of information missing from the message is the key that generated the MAC. The message contains the key ID that is needed to locate the key to generate the MAC. Thus the backup site 150 can still process the message.

In order to provide a backup site which is always ready for a failover, according to various embodiments, the backup site 150 is tasked with generating new keys for key rollover, and replicating these keys periodically to the primary site 110. An example of one process to generate keys will be discussed in more detail with respect to FIG. 4 below. Any time a rollover occurs, the data servers 172, 174, 176 use, in one embodiment, a built in replication processes to keep synchronized. During a rollover, the key data including a key value are replicated back to the primary site. This guarantees that any authentication code generated at the primary site 110 is using a key that is already at the backup site 150. This allows the generation of keys to occur on servers that are not being used for processing, which can improve overall system performance. This also reduces the problem of key syndication as the keys are always on the backup site before they are used and the backup site is ready for immediate activation.

The rollover process begins, in one embodiment, when the data server 176 activates a key generation protocol. In this embodiment, the data server 176 is tasked with generating new keys. However, the rollover process and key generation can be performed on any data process or could be distributed between the servers. This protocol can be any protocol that generates keys. Once the key is generated a transfer protocol is executed whereby the newly generated keys are replicated to the primary site. Any transfer protocol can be used to replicate the keys over to the primary site 110.

Connection 190 between the two sites 110, 150 is used for data replication purposes, according to one embodiment. According to various embodiments, this connection 190 can be a dedicated connection, an internet connection or any other method of connecting the two sites providing reliable and secure communications of key sets. In one illustrative embodiment, these are small data replications to ensure that any time the keys are rolled over, the primary site 110 has its table of keys 131 updated.

In these embodiments, the rollover feature on the data servers 132, 134, 136 is turned off at the primary site 110 thus, there is no other way for a new key to get to the primary site 110. In some embodiments the primary site 110 and the backup site 150 can switch roles. In those cases the primary site 110 becomes the backup site 150 and activates its rollover process. While at the same time the backup site 150 turns off the rollover process. Thus, by the time the key arrives at primary site 110 for use, any message that needs to be authenticated can also be authenticated at the backup site 150.

Referring now to the transport of messages between the service 110 and client 140, these messages will have a MAC included in them. In one embodiment, the message can be transmitted between the client 140 and the service 110 over the network 180. This message can be in response to an HTTP request, and the generated message is a URL or link from the primary site 110. However, this request can be in any format. This link contains the data that is processed on subsequent requests to verify the authenticity of the message. For example, a subsequent request can be a request for a resource image, such as a stamp or indicia. In one embodiment, the message authentication code is encoded into the URL that is used for accessing the image. However, the message is not limited to images, any data can be requested.

For purposes of this discussion a brief description of an exemplary process for generating a postage indicia is provided. A user desiring to generate postage to ship an item interacts with a software program such as the software for postage generation clients and postal servers, or the internet based programs such as the program provided by Stamps.com. The program provides the user an interface whereby they can perform a number of operations related to the generation of postage. These operations can include entering in the address where the item is being sent, the method the item is to be sent (e.g., express mail, priority mail, first class mail, second class mail, etc.), the type of item being sent (e.g., letter, package, etc.), and any customization that the user desires (e.g., a message or a logo). This information is transmitted to the program. The program takes this information, and determines the required amount of postage. This postage is then either debited from an account associated with the user, or the user can be requested to provide payment information (e.g., credit card, e-check). Once the program has obtained payment for the required postage, the program generates an indicia of the postage. Into the indicia the program can encode a security feature. For example, this security feature can be encoded into a bar code such as a PDF 417 two dimensional bar code. The bar code can have both encrypted information (for authenticating the indicia) and unencrypted information (readable by scanners to, for example, automate the sorting of the item). Once any security features are added to the indicia the service presents the indicia to the user. Depending on the configuration of the program and the user's site, the indicia is printed by the user either directly on the item or onto a label that is affixed to the item. More detail with respect to an exemplary process for generating indicia of postage is provided in the above referenced patent applications entitled "SYSTEM AND METHOD FOR GENERATING PERSONALIZED POSTAGE INDICIA" and "VIRTUAL SECURITY DEVICE".

In one embodiment, the service has the ability to access an image based on the information contained in the URL. In the example where the image is something of value, such as postage, security is necessary to ensure that the URL is coming from the client 140, and has not been altered. To secure the URL for an image, the service generates and encodes that indicia into the URL, and places message authentication code into the URL for security as well. Thus, when the message is received it is passed to a data server 132, 134, 136, and then authenticated. This allows the server to know, for example, that the message is a real message and not fabricated, and there is money supporting the postage image.

One illustrative embodiment is for a service that generates postage (indicia) that is then used by a partner website. For example, this partner website, can be a site for a person selling items to generate postage for shipping the item using the partner site's account, a shipping company, or a company that pays the postage for customer returns. However, other types of partner sites can be envisioned. Thus, this partner site needs to allow their customers to take messages from the partner website that were generated by the service. In this embodiment, the service can access the indicia in the form of a URL to an image, where the image has value. In this embodiment, the URL is generated by the initial request to the service by the partner website to generate postage. However, a subsequent response to the service might be held for up to a day by the partner for various reasons. However, in the present embodiments the URL itself contains enough data to retrieve the indicia, so the message can be authenticated by the service if the partner site goes down. The system does not need to generate the indicia, if, for example, the service already has deducted the money from a postage meter. All the service needs is the specific pieces of data. This data is packaged into the URL. The URL allows the system to obtain the message authentication code from the initial request to generate postage.

In various embodiments the message authentication codes in the URL are valid until the expiration time. In one embodiment, the expiration time has been encoded into the URL, has passed. This permits the URL to be requested at any time by the user until that expiration time has passed. This allows the user the ability to reprint the page if, for example, their printer jams after they first printed it. It also allows the partner sites to store URLs so that the end user can close their browser, log back into the partner site at a later time, and see the images generated from the service up until that expiration time without having direct access to the service. However, other approaches can be used.

Figure 2:
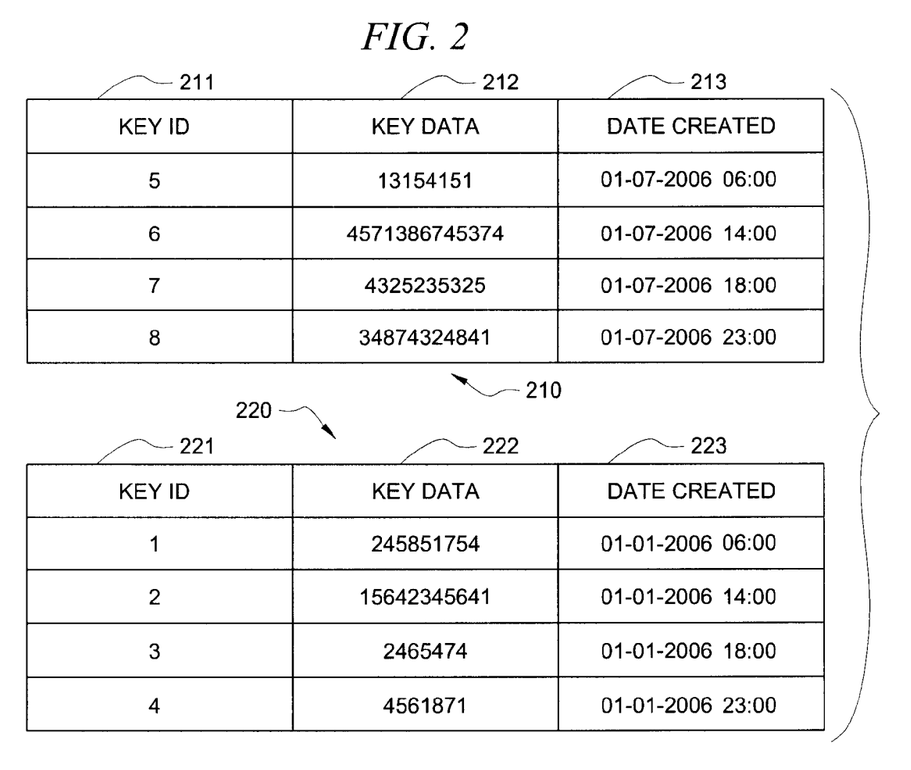
FIG. 2 is an illustrative representation of an active key table and an inactive key table according to one embodiment.

When using expiration time, the time can be set using the date and time of the data server. In one embodiment, the data servers have a normal clock. However, other types of time keeping methods can be used. In one embodiment, sites 110, 150 are synchronized. However, synchronization is not required. In one embodiment, the expiration time is set to a day, so if the synchronization is off by a second or two it does not significantly affect the outcome. However, other time periods can be used such as an hour, a week, a month, etc. In another embodiment both sites 110, 150 are synchronized to an external time source so that when a failure occurs the expiration time is not affected. If for some reason the times are not synchronized the data servers 132 will still work and authenticate. This ability to handle messages that are out dated (slightly old) is achieved, in one embodiment, through the use of two tables. The use of two tables allows for the backup site 150 to use old keys that the primary site 110 assumed were still valid. This can occur because there is a slight delay in the transmission of the new keys from the backup site to the primary site. FIG. 2 illustrates the data included in these tables according to one embodiment. The first table 210 is an active key table and is stored, in one embodiment, in data stores 131 and 171 in FIG. 1, and the second table 220 is an inactive key table and is stored in data store 173 in FIG. 1. However, in some embodiments the inactive keys are stored in data stores 131 and 171 as well. Data stores 171, 173 are illustrated in server 172 for purposes of simplicity. Those skilled in the art will recognize that these tables may be located on other servers as well, or may be located on a single server that is accessed by all of the data servers.

There are several functions that are on the data server 132, 134, 136, 172, 174, 176, in one illustrative embodiment, that affect the associated data tables 131, 171. One function is a random key generator. This random key is generated, according to one embodiment, using a tool in the system, and a random number. This random number is processed using a cryptographically secure algorithm. In one embodiment, such as in a .NET provider the algorithm is RNGCryptoService-Provider. However, any cryptographically secure number generator or algorithm can be used.

In one embodiment, another function that is on the data server 132, 134, 136, 172, 174, 176 is an algorithm for generating MAC which takes as inputs the key ID 211 and the key data 212. This function does not rely on the data server 132, 134, 136, but on a piece of code that invokes the function to get that data from the data store 131. Other parameters that can be used in the function are the data to be mapped, and the expiration time. In one embodiment, when generating a MAC or authenticating a message, a HMAC-SHA1 algorithm is used, and this algorithm returns the MAC. However, any other function or algorithm that can generate message authentication code such as HMAC-MD5 can be used. The HMAC-SHA1 algorithm uses a three column table. However, in other embodiments more or less columns can be used. The tables that are in the data store 131, 171 are in one embodiment the HMAC Key Table 210 of FIG. 2. The first column is the key ID 211 which is an integer. In one embodiment, key ID 211 is a 32 bit integer. However, other sized key IDs can be used. In a SQL server implementation, the database itself is responsible for generating new key IDs 211. However, depending on the requirements of the algorithm more or less information than illustrated can be in table 171, 173. The next column 212 is a 32 byte Key Data. However, other sizes can be used. The third column 213 represents the date created at a date time level. However, other levels can be used, such as hour or minute time levels. The Inactive HMAC Key Table 220, has the same three columns, as active table 210, key ID 221, key data 222 and date created 223. However, other information can be present on table 220. It should be noted that the key ID 221 is not generated, but is copied from the active table 210. The table 220 is populated through the rollover procedure. However, in some embodiments the inactive key table 220 holds only those keys that cannot possibly be used for a valid message. In this embodiment the rollover process can check the inactive key table 220 to ensure that a key is not reused due to a random occurrence in the key generation algorithm.

In one illustrative embodiment, there are a plurality of functions that are installed on the data server, but are not exposed to users of the data repository, such as the servers 122, 124, 126. For example, to enhance the security of the system the data repository only exposes the variables needed to perform the procedures to the users. Thus, only the variables required to perform the functions are known by the users, the actual procedures performed on the data repository are hidden from the users. The data repository can expose an interface to the servers 122 that requests or provides the needed variables for the desired procedures. One such procedure that is not exposed to the server, according to one embodiment, is a Hash Message Procedure which takes the records that are to have message authentication code added, and computes the MAC. In this function the key ID 211 is used. In one embodiment, the highest numbered key ID 211 is used and, the expiration time is set to one day in advance of the current time. The function then computes the hash using the HMAC-SHA1 algorithm that is installed in the data server 132. These three values are the output from the procedure to the server 122.

Another procedure which is not exposed from the data repository 130 is an authenticate message procedure. This procedure, in one embodiment, uses the key ID 211, expiration time, and the hash in the received message as inputs and recalculates the MAC. The procedure then takes this hash, and compares this with the received hash. If they are equal it returns a zero to service as an indication of success. Otherwise it returns an error code. For example, it can return HMAC key not found error, which means that the key ID given as an input was not found in the table 131. This is generally an indication that someone has tampered with the message. It can return an indication that the message is expired. This is usually because the expiration time provided has passed, and the message was submitted for processing after the expiration time. It can return finally as an error an invalid MAC. This occurs when the hash does not match the computer value. This generally indicates that someone has tampered with the message between calls.

Another procedure that is not exposed by the repository is the key rollover procedure. This procedure has no parameters and no return value to generate. The results of the procedure are not exposed to the services 120, 160, but are exposed to the associated data repositories 130 and 150. In one embodiment, it is called Rollover HMACKey. It generates a new HMAC key. This key is stored into the HMAC key table 171 and moves any HMAC keys that can no longer possibly be used in the invalid HMAC key table 173. This procedure is only active on the backup site 150. However, the rollover procedure may be present on both sites.

Figure 3:
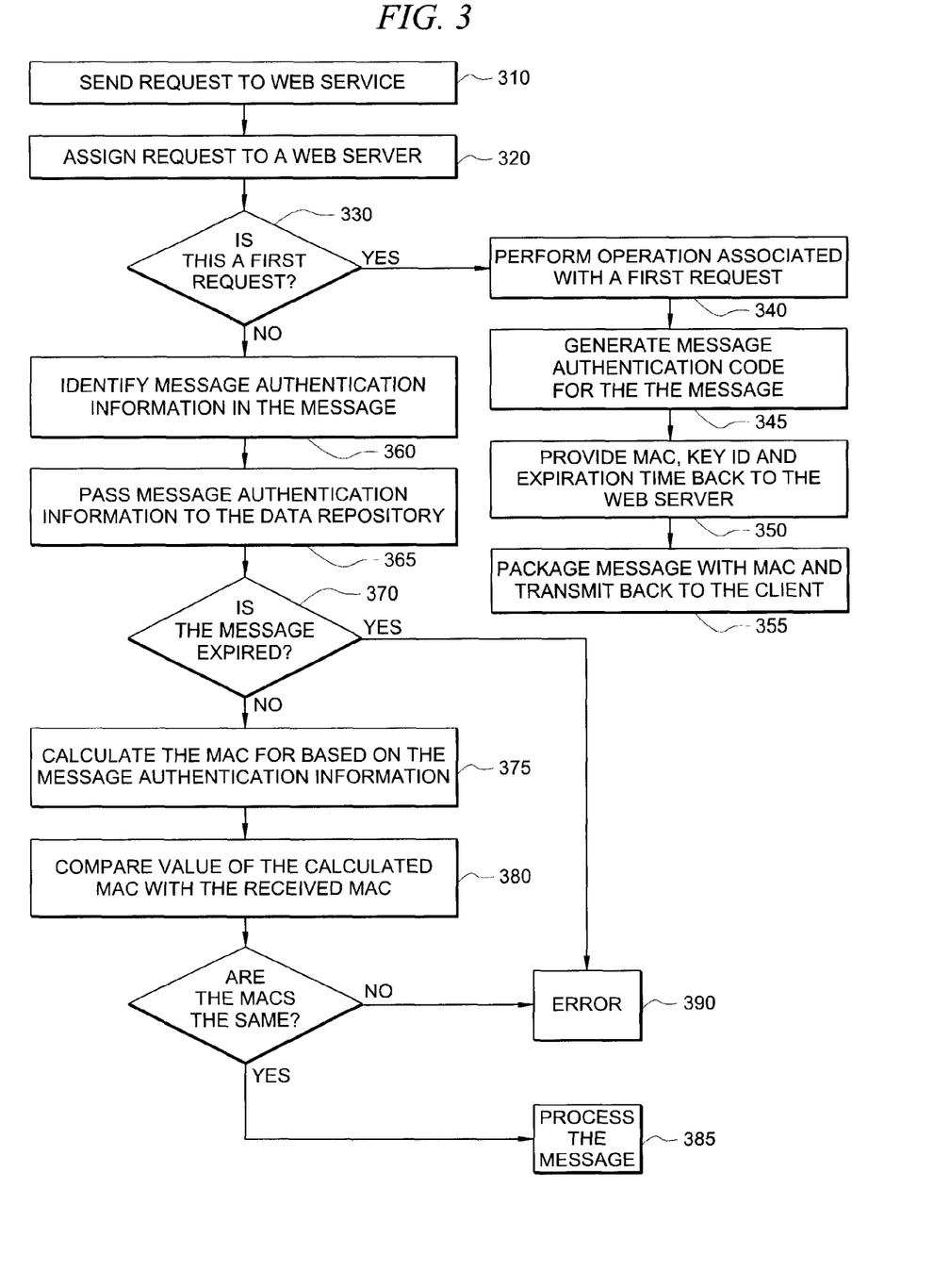
FIG. 3 is a flow diagram illustrating the steps for authenticating a message according to one embodiment.

FIG. 3 is a flow diagram illustrating steps executed when generating or authenticating a message according to one embodiment. The illustrative process starts when a client device 140 sends a request in the form of a message to the service 100 to perform an operation. The operation is any operation that is performed by the service 100. This is illustrated at step 310. In this embodiment the operation that is being performed is one that requires that the service 100 trust the client. This "trusting" is achieved through the use of message authentication techniques. As discussed above any technique of message authentication can be used.

Once the message has been received at the service 100 and site 110, it is assigned to one of the servers that are in the primary site's 110 farm of servers. This is illustrated at step 320. The server 122 then determines if the client is making its first request to the service 100, or is making a subsequent request to the service. This is illustrated at step 330. If the client 140 is making its first request to the service, the server 122 will perform an associated operation (e.g. validate the client and/or associated information such as account information with the client), and from that operation generate a response message. This is illustrated at step 340. Once the response message has been generated, the server 122 communicates with the data repository 130 that is on the site 110 to request message authentication information. The data repository 130 selects a data server 132, 134, 136 and obtains a key ID 211 and an associated key value 212 for that ID. This value is then passed to the message authentication processor 137, which can be in some embodiments on the data server 136, to obtain a message authentication code. This is illustrated at step 345.

Once the message authentication code has been obtained the data repository 130 transmits back to the server 122, 124, 126, the key ID, the MAC and an expiration time for the code. This is illustrated at step 350. In one illustrative embodiment, the expiration time is set for one day. However, depending on the system's operating characteristics or needs, other expiration times can be used such as one hour, or one week. The message is then put together with the MAC and transmitted back to the requesting client 140. In one embodiment, this message includes a URL address where the requested information is located. However, other message types can be used depending on the type of information desired. This is illustrated at step 355.

If the service 110 determines at step 330 that the incoming request is a follow-on request the site 110 examines the incoming message for the particulars of the message authentication information. This is illustrated in step 360. In one embodiment, the primary site 110 obtains from the message a key ID, an expiration time and a MAC. This information is passed to data repository 130 for authentication. This is illustrated at step 365. The data repository 130 authenticates the message by first checking that the expiration time is not in the past. This is illustrated at step 370. If it is not in the past, the repository searches the database for the value associated with the key ID 211. Otherwise it generates an error.

Once the associated value for the key ID has been located, the repository 130 processes this value through the message authentication processor 137 to obtain a MAC value. This is illustrated at step 375. This newly computed MAC value is then compared with the received MAC value. This is illustrated at step 380. If the two MAC values are the same then the data repository 130 indicates that the message is authentic to the server 122. The server 122 then proceeds to process the message. This is illustrated at step 385. If the two values are not the same the data repository indicates that the message is erroneous and the server returns to the client device an error message, at step 390.

Figure 4:
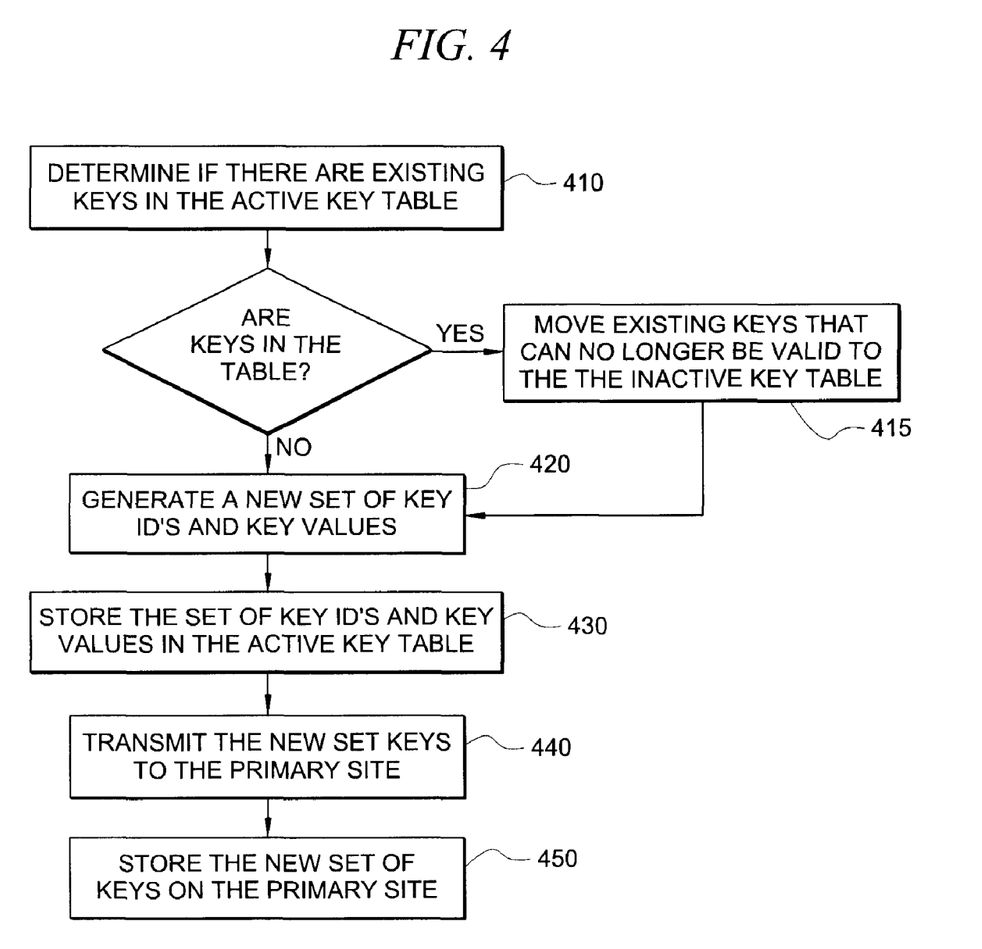
FIG. 4 is a flow diagram illustrating steps for generating keys according to one embodiment.

FIG. 4 is a flow diagram illustrating the steps executed by the service in generating the keys for message authentication according to one embodiment. The first step of the process is for the backup site 150 to determine if there are any existing keys for message authentication in table 173. This is illustrated at step 410.

If there are existing keys for message authentication, these keys can be moved to the inactive key table 173. This is illustrated at step 415. If there are no keys in table 171, then the process proceeds to step 420. However, in one alternative embodiment at step 415, where the system makes keys that can no longer be used for a currently valid message from the active key table 210 to the inactive key table 220 the rollover procedure uses an algorithm to identify those keys. This algorithm first acquires the current time. Next the algorithm identifies the latest valid key in the active key table 210. This key is located by using the current time and subtracting the expiration time. Once this key is located all keys that are in the active key table 210 that are older then the identified key are moved to the inactive key table 220.

At step 420 the backup site 150 generates a set of new key ID's and associated key values to use for the message authentication. At step 420, the backup site 150 can in some embodiments assign the key ID 211 and the key values 212 an expiration time. This expiration time can be the same as the expiration time used for the message authentication code when dealing with client requests, or can be another expiration time that indicates to the system the point at which this key ID 211 and key 212 will not be used for generating message authentication. As discussed elsewhere, the key ID 211 can be generated using SQL identity feature, or can be generated using any other method. The key value 212 can be a randomly generated value, it can be calculated from a predefined algorithm or any other method. Once the set of new key values 212 and key ID 211 has been generated, the set is stored in the table 171. The storing of the new set of keys is illustrated by step 430.

Once the new keys have been stored in table 171, the backup site 150 communicates with the primary site over communications link 190. Once the communications link 190 is opened the backup site 150 transmits the new set of keys in table 171 to the primary site 110. This is illustrated at step 440. The primary site 110 then adds the new set of keys to its table of keys 131. This is illustrated at step 450. In some embodiments, the primary site 110 can remove the existing keys in the table 131 when a new set is received. However, the primary site 110 in some embodiments only removes from the table of keys 131 those keys whose expiration time has expired.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system which maintains secure communications with a secure service despite a server-failure comprises:
    a primary server operable to provide the secure service, wherein the primary server receives validation information from a user and validates the user based on the validation information;
    message authentication information comprising a first portion and a second portion, wherein the primary server sends to the user the message authentication information upon validation of the user, and thereafter, the primary server receives a message from the user including at least some of the message authentication information;
    a data repository generating and storing a plurality of keys;
    a server failure protocol operable to detect that the primary server has failed and divert subsequent messages away from the failed primary server; and
    a backup server operable to receive the diverted messages, authenticate the diverted messages, and perform a requested operation of the secure service upon authentication of the diverted messages, wherein while authenticating the diverted messages, the backup server is operable to (a) identify a particular key of the plurality of keys based on the first portion of the message authentication information included in the diverted message, (b) calculate a value using the particular key, (c) compare the value to the second portion of the message authentication information included in the diverted message, and (d) determine that the diverted message is authentic based on the comparison.

2. The system of claim 1 wherein the backup server only provides the secure service upon detection that the primary server has failed.

3. The system of claim 1 further comprising:
    a second protocol operable to detect that the primary site has resumed the ability to provide the secure service and direct succeeding messages to the primary server for processing.

4. The system of claim 1 wherein the primary server failure is caused by at least one of:
   a computer failure;
   a physical disaster; and
   an overflow need.

5. The system of claim 1 wherein the secure service is postage generation.

6. The system of claim 1 wherein the validation information comprises: a user ID; and a password.

7. The system of claim 1 wherein the message authentication information further comprises:
   an expiration time.

8. The system of claim 1 wherein the backup server generates the plurality of keys.

9. The system of claim 1 wherein the first portion is a key ID and the second portion is a comparison value.

10. The system of claim 9 wherein the key ID is a pointer.

11. The system of claim 1 further comprising:
    an active key table, located on the date repository, which stores the plurality of keys which are active; and
    an inactive key table, located on the data repository, which stores the plurality of keys which were previously active keys.

12. The system of claim 11 wherein the backup server populates the inactive key table by rolling over the previously active keys into the inactive key table upon generating new keys for the active key table.

13. The system of claim 11 wherein a diverted message of the diverted messages is not authenticated when the particular key is not stored in the active key table.

14. The system of claim 11 wherein a diverted message of the diverted messages is not authenticated when the particular key is not stored in the active key table or the inactive key table.

15. A method of maintaining secure communications with a secure service despite a server-failure comprising:
    providing, by a primary server, the secure service;
    generating, by a backup server, a plurality of keys;
    storing the plurality of keys;
    receiving, by the primary server, validation information, and validating a user based on the received validation information;
    sending, to the validated user, message authentication information;
    detecting that the primary server has failed and thereafter providing, by a backup server, the secure service;
    receiving a secure service request comprising at least some of the message authentication information, wherein the received the message authentication information comprises a first portion and a second portion;
    directing the received secure service request to a backup server for processing;
    authenticating the received secure service request, wherein the authenticating comprises:
    identifying, based on the first portion of the received message authentication information, a particular key of the plurality of keys,
    calculating a value using the particular key,
    comparing the value to the second portion of the received message authentication information, and
    determining that the received secure service request is authentic based on the comparing; and
    performing, by the backup server, an operation requested in the authenticated received secure service request.

16. The method of claim 15 wherein the backup server is not operable to provide the secure service while the primary server is operable to provide the secure service.

17. The method of claim 15 further comprising: detecting that the primary site has resumed the ability to provide the secure service and directing succeeding messages to the primary server for processing.

18. The method of claim 15 wherein the primary server failure is caused by at least one of:
    a computer failure;
    a physical disaster; and
    an overflow need.

19. The method of claim 15 wherein the secure service is postage generation.

20. The system of claim 15 wherein the validation information comprises:
    a user ID; and
    a password.

21. The method of claim 15 wherein the message authentication information further comprises: an expiration time.

22. The method of claim 15 wherein the first portion is a key ID and the second portion is a comparison value.

23. The method of claim 15 wherein the key ID is a pointer.

24. The method of claim 15 wherein the plurality of keys are stored in a table comprising:
    an active key table, which stores the plurality of keys which are active; and
    an inactive key table, which stores the plurality of keys which were previously active keys.

25. The method of claim 24 further comprising: populating the inactive key table by rolling over the previously active keys into the inactive key table upon generating new keys for the active key table.

26. The method of claim 24 further comprising: denying the authentication of the diverted message when the particular key is not stored in the active key table.

27. The method of claim 24 further comprising: denying the authentication of the diverted message when the particular key is not stored in the active key table or the inactive key table.

* * * * *